United States Patent [19]

Stierli et al.

[11] 3,960,580

[45] June 1, 1976

[54] MAGNESIUM PHOSPHATE CONCRETE COMPOSITIONS

[75] Inventors: Robert F. Stierli, Lexington; Clayton C. Tarver, Everett, both of Mass.; James M. Gaidis, Columbia, Md.

[73] Assignee: W. R. Grace & Co., Cambridge, Mass.

[22] Filed: Nov. 21, 1974

[21] Appl. No.: 525,687

[52] U.S. Cl. .................................... 106/58; 106/85
[51] Int. Cl.² .................... C04B 9/04; C04B 35/04
[58] Field of Search ............................ 106/58, 85

[56] References Cited
UNITED STATES PATENTS 3,241,987    3/1966    Dreyling et al. ................. 106/58

*Primary Examiner*—J. Poer
*Attorney, Agent, or Firm*—William L. Baker; C. E. Parker

[57] ABSTRACT

The setting time of quick-setting magnesium oxide-ammonium phosphate concretes is extended by the addition of specified oxy-boron compounds such as sodium borate. The incorporation of the oxy-boron compound in the composition has also been found to increase the extended or overall compressive strength of the composition.

20 Claims, No Drawings

MAGNESIUM PHOSPHATE CONCRETE COMPOSITIONS

BACKGROUND OF THE INVENTION

The present invention relates to an improvement in quick-setting magnesium phosphate-based cements. More particularly, this invention concerns an improvement of normally quick-setting cement and concrete compositions based upon magnesium oxide and ammonium phosphate, whereby the setting time of the composition is retarded to a desired degree by the incorporation of certain additives in the compositions. Additionally, an increase in the extended or overall compressive strength of the retarded compositions has been observed.

Plastic compositions having a very quick-setting time and prepared by mixing a magnesium oxide component with an ammonium phosphate component and usually an aggregate have become popular for use in repairing or patching cracks, holes and spalled areas of highways, airfield pavements and bridge decks, as well as for a variety of commercial and industrial applications. Compositions in particular described in U.S. Pat. No. 3,285,758 to Limes and Ponzani wherein a solid aggregate component containing magnesium oxide is mixed with an aqueous solution of ammonium polyphosphates have found successful application in these areas. The compositions set in substantially less than one half hour at 70°F after mixing, and the strength development of these compositions is sufficiently rapid to permit for example automobile traffic thereover within a few hours following application. Additionally, the compositions exhibit excellent adhesion to Portland cement concrete, steel and to themselves, and attain high ultimate compressive strength and are durable.

It was found however that the normally quick-setting time of such compositions became even more rapid with increasing ambient temperature. Thus the work life of the composition upon mixing of the two reactive components became substantially reduced at the higher ambient temperatures. This reduction of the work life can pose a problem for example in cases where the compositions are utilized as patching or grouting materials for roadways during hot summer days when ambient temperatures rise significantly above 70°F. The addition of greater proportions of water than normally called for to the compositions accelerated the setting time and adversely affected the set strength of composition. There is a need therefore for a practical method of retarding the setting time and thereby extending the work life of the composition without adversely affecting other desirable properties of the composition.

SUMMARY OF THE INVENTION

In an attempt to fill this need, a variety of chemical additives were incorporated in the composition to determine their effect on the setting time thereof. Such additives included well known retarding agents for hydraulic cements such as starch, sugars and corn syrup, which surprisingly had little or no effect on the setting time.

The present invention is based upon the finding that significant and practical retardation of the setting time of quick-setting magnesium oxide ammonium phospate cements of the type described above can be attained by incorporating certain boron compounds in the composition in sufficient set-retarding amounts. The additives of the invention do not adversely affect other desirable properties of the composition. In fact, an unexpected increase in the extended or overall compressive strength of the composition has been observed attendant the use of the additives. The degree of set-retardation can be correlated directly with the amount of the additive employed, resulting in an accurate, reliable method of obtaining a given desired setting time. Moreover, the degree of retardation is controllable over a wide time range. For example, the normal setting time of the magnesium oxide-ammonium phosphate cements described in the above patent can be extended for as little as 1 minute to as much as 40 minutes or longer.

A further desirable objective attained according to the invention resides in the discovery that the additives of the invention permit a fast setting, "one component" magnesium oxide-ammonium phosphate cement composition to be prepared. As mentioned above, the compositions of U.S. Pat. No. 3,285,758 result from the mixture of a magnesium oxide solid component with an aqueous component comprised of a solution of ammonium polyphosphate. The two compounds cannot be pre-mixed and offered for use as a one-component product because of the hardening reaction which occurs soon after their combination. As pointed out in the patent, solid monoammonium phosphate reacts much too quickly with magnesium oxide in the presence of water to permit a practical product based upon this component alone. As further mentioned in the patent, slowing down the reaction rate of the monoammonium phosphate by dilution thereof results in a loss of strength of the final product. The additives of the invention however have been found to sufficiently retard the rapid reaction of the monoammonium phosphate component, while at the same time increasing the final strength of the set product rather than diminish it. The commercial advantages of a factory-prepared, one-component product requiring the addition of water alone for activation are obvious.

DETAILED DESCRIPTION OF THE INVENTION

The set-retarding additive compounds of the invention generally comprise those boron compounds containing at least one boron-oxygen linkage, hereinafter termed "oxy-boron" compounds. Such additives include, for example, oxyacids of boron which contain one or more boron atoms such as, for example, boric acid; salts of such acids, such as the alkali metal salts thereof, for example, sodium borate (e.g. borax) and amine or ammonium salts thereof such as, for example, ammonium borate; and esters of such acids, such as trialkoxyborates and triaryloxyborates, for example, trimethylborate. The oxy-boron additives of the invention may be added to the quick-setting compositions as already formed or pre-formed compounds, or boron-containing starting materials which yield the oxy-boron additives of the invention upon contact with water may be used to generate the additives in situ. Mixtures of the aforementioned oxy-boron compounds may also be employed. Because of its proficiency as a retarder for the quick-setting magnesium oxide-ammonium phosphate compositions and its availability, sodium tetraborate decahydrate or borax is especially preferred for use herein.

A preferred magnesium oxide-ammonium phosphate quick-setting based composition in which the oxy-boron additive of the invention is particularly effective, is, as aforementioned, described in U.S. Pat. No. 3,285,758, the disclosure of which is hereby incorporated by reference. The reactive phosphate component utilized therein comprises an aqueous solution of ammonium phosphate containing orthophosphate, pyrophosphate and polyphosphates, the polyphosphates including tripolyphosphate, tetrapolyphosphate and higher polyphosphates. Preferred are phosphate mixtures containing about 35–40% by weight of orthophosphate, 45–50% by weight pyrophosphate, 9–11% by weight tripolyphosphate, and 2–5% by weight of higher polyphosphate. Such compositions show about 8–12% ammoniacal nitrogen and about 30–35% total $P_2O_5$.

A particularly suitable ammonium phosphate solution is a commercial product known as sequestered phosphatic solution primarily used as an agricultural fertilizer. Such solutions contain orthophosphates, pyrophosphate and polyphosphates. A typical analysis shows 10.2% ammoniacal nitrogen, and 24.2% total $P_2O_5$. The $P_2O_5$ distribution is approximately 38% as orthophosphate, 48% as pyrophosphate, 10% as tripolyphosphate, 3% as tetrapolyphosphate and 1% as higher polyphosphate. The commercial product has approximately 4% of impurities, which do not adversely affect its use in the composition. These impurities comprise approximately 1.7% sulfuric acid, 0.6% iron, 0.5% aluminum and 0.05% fluorine. This commercial product also contains roughly about 50% water.

In another preferred magnesium oxide-ammonium phosphate based, quick-setting composition according to the invention, the reactive phosphate component is comprised predominately of, or entirely of, monoammonium phosphate in dry solid form, and the oxy-boron additive of the invention is employed as aforementioned to retard the normally rapid, highly exothermic reaction resulting in the possibility of a one-component product having an increased overall strength.

While the aforementioned reactive ammonium phosphate component is necessary to give the desired fast-setting compositions, a portion of the total phosphate can be comprised of a lesser reactive phosphate such as a sodium or potassium phosphate.

Magnesium oxide or magnesia is also a necessary component in the fast-setting compositions of the invention. Magnesium oxide, or magnesia-containing synthetic or natural materials, such as dead burned magnesia and dead burned dolomite, can be used to provide a portion or all of the reactive magnesium oxide component.

Fillers or aggregates are a generally desirable additional component in the quick-setting compositions of the type herewith concerned. Exemplary fillers or aggregates include silica or sand, alumina, zircon or zirconia, raw dolomite, chrome ore, limestone, clinker, vermiculite, perlite, and fly ash. Fly ash has been found to reduce the viscosity of the compositions and to allow use of greater proportions of economic fillers without sacrifice of strength. Fly ash-containing compositions of the invention have also been found to require less water to reach a given workability of the wet mix. Such compositions of reduced water content have been found to desirably exhibit exceptionally high early strength development.

In the quick-setting compositions according to the invention, the amount of reactive phosphate component will generally range from about 25 to about 200 percent by weight, based upon the reactive magnesium oxide component. The filler or aggregate portion can vary from 0 up to about 80% by weight of the total composition. The precise amount of the oxy-boron retarding component will vary, of course, according to the degree of retardation desired, but in all cases at least an amount sufficient to retard the setting time is employed. Generally, an amount of the oxy-boron component ranging from about 0.1 to about 20, preferably about 0.1 to about 5% by weight based upon the combined weight of the reactive magnesium oxide-phosphate components will be found suitable. The precise amount of water employed can again vary according to the amount and type of other ingredients present and degree of workability desired. In the aforementioned "one-component" formulations of the invention, an amount ranging between about 4 and 10% by weight of the total has been found generally desirable.

The quick-setting compositions of the invention are as aforementioned characterized as having a normal setting time of less than one half hour, more often less than about 15 minutes, at 70°F which can be delayed for as little as 1 minute to as much as 40 minutes or longer depending on the amount of oxy-boron retarding employed. In the present invention, the setting time of the composition is measured according to ASTM C403. The compositions of the invention reach a compressive strength generally of at least 400 p.s.i. after 2 hours, and generally attain compressive strengths of at least 1,500 p.s.i. after 24 hours. Compressive strengths are determined herein according to ASTM C109.

The following examples further illustrate the invention but should not be considered as limiting the present invention.

EXAMPLE I

A mixture containing 360 grams of a fused magnesium oxide (Tennessee Electric T152) containing about 90% MgO, and 1440 grams of dolomite (BASIC CHEMICALS DRY 8's) is prepared and 414 grams of the commercial sequestered ammonium polyphosphate solution previously described is then added. The resulting mass was then mixed for 1 minute and poured into molds for testing. The tested samples set in 9.5 minutes and attained compressive strengths of 2,800 p.s.i. after 2 hours, 4,975 p.s.i. after 24 hours, 6,425 p.s.i. after 7 days, and 7,925 p.s.i. after 28 days. All tests were made at 72°F.

EXAMPLE II

Varying amounts of sodium tetraborate decahydate (borax) were added to the dry mixture of magnesium oxide and dolomite of Example I prior to addition of the phosphate component. Samples were prepared and tested for setting time and compressive results as in Example I at 72°F and the results recorded. The amount of borax and the esults of the tests are shown in Table 1.

TABLE 1

| Borax (wt. % of Solids) | Setting Time (Min) | COMPRESSIVE STRENGTH | | | |
|---|---|---|---|---|---|
| | | 2 Hrs. | 24 Hrs. | 7 Days | 28 Days |
| 0 | 9.5 | 2,800 | 4,975 | 6,425 | 7,925 |
| 1 | 15 | 750 | 3,400 | 6,250 | 8,575 |
| 2 | 23 | 600 | 2,225 | 4,725 | 7,150 |

TABLE 1-continued

| Borax (wt. % of Solids) | Setting Time (Min) | COMPRESSIVE STRENGTH | | | |
|---|---|---|---|---|---|
| | | 2 Hrs. | 24 Hrs. | 7 Days | 28 Days |
| 3 | 30 | 425 | 1,500 | 3,850 | 6,450 |

A comparison of the results shown in Table 1 with those of Example I indicates that the setting time of the composition of Example I was increasingly delayed with increasing borax addition rate. While early strength development of the borax-containing samples was expectedly less than that of Example I because of the delayed setting time, the data indicates that the ultimate strength eventually of the borax containing samples becomes greater as time goes on.

EXAMPLE III

In another experiment, a composition was prepared from the same ingredients of Example I in the same proportions employed therein. Table 2 shows the results of compressive strength measured at 72°F with this composition and also an identical composition to which was added 2 percent of boric acid.

TABLE 2

| Boric Acid (wt. % of Solids) | Setting Time (Min) | COMPRESSIVE STRENGTH | | | |
|---|---|---|---|---|---|
| | | 2 Hrs. | 4 Hrs. | 26 Hrs. | 7 Days |
| 0 | 7½ | 2,600 | 3,200 | 4,650 | 5,775 |
| 2 | 12½ | 1,100 | 1,300 | 3,975 | 7,475 |

EXAMPLE IV

Table 3 below sets out the compressive strengths obtained in a test at 72°F comparing the composition of Example III (containing no boric acid) with identical compositions to which was added 0.5 and 1.5 percent, respectively, of ammonium pentaborate.

TABLE 3

| Amm. Pentaborate (wt. % of Solids) | Setting Time (Min) | COMPRESSIVE STRENGTH | | | | | |
|---|---|---|---|---|---|---|---|
| | | 2 Hrs. | 4 Hrs. | 26 Hrs. | 7 Days | 28 Days | 41 Days |
| 0 | 7½ | 2,600 | 3,200 | 4,650 | 5,775 | 7,500 | 9,275 |
| ½ | 14½ | 1,050 | 1,275 | 4,025 | 6,725 | 9,050 | 9,900 |
| 1½ | 22 | 675 | 925 | 1,925 | 6,325 | 8,950 | 9,075 |

EXAMPLE V

Table 4 below sets out the compressive strengths obtained in a test at 72°F. comparing the composition as in Example III (containing no boric acid) with compositions to which was added 2 percent of trimethylborate.

TABLE 4

| Trimethylborate (wt.% of Solids) | Setting Time (Min) | COMPRESSIVE STRENGTH | | | |
|---|---|---|---|---|---|
| | | 2 Hrs. | 4 Hrs. | 26 Hrs. | 7 Days |
| 0 | 7½ | 2,600 | 3,200 | 4,650 | 5,775 |
| 2 | 13½ | 925 | 1,575 | 4,500 | 7,100 |

EXAMPLE VI

Experiments were conducted with a composition as in Example I, and the same composition with varying amounts of borax added. Table 5 below shows the results of compressive strength tests at 100°F.

TABLE 5

| Borax Content (wt. % of Solids) | Setting Time (Min) | COMPRESSIVE STRENGTH | | |
|---|---|---|---|---|
| | | 2 Hrs. | 4 Hrs. | 28 Days |
| 0 | 3 | 3,875 | 4,875 | (NOT TESTED) |
| 1 | 6 | 1,350 | 2,700 | 10,225 |
| 2 | 10½ | 1,025 | 1,900 | 11,200 |
| 3 | 15 | 775 | 975 | 10,000 |

EXAMPLE VII

A series of experiments were conducted to determine the effect of borax on quick-setting compositions wherein the reactive phosphate component comprised dry, solid, monoammonium phosphate. As a control, a mixture containing 200 grams of fused magnesium oxide, 800 grams of dolomite and 100 grams of monoammonium phosphate (analytical grade) was prepared and 100 grams of water added thereto. The result was a violent exotherm, with the mixture setting in 3.5 minutes at 72°F.

To samples of the same dry mixture before addition of water were added, respectively, 10 and 20 grams of borax. Following addition of 100 grams of water, the test results shown in Table 6 were obtained at 72°F.

TABLE 6

| Borax (wt. % of Solids | Setting Time (Min) | COMPRESSIVE STRENGTH | | |
|---|---|---|---|---|
| | | 2 Hrs. | 4 Hrs. | 24 Hrs. |
| 1 | 10 | 2,400 | 4,075 | 5,100 |
| 2 | 23 | 1,175 | 2,525 | 3,600 |

As expected from the teachings of U.S. Patent 3,285,758, the control composition of Example VII using the dry solid monoammonium phosphate reacted too quickly to be of practical value as a quick-setting patching or repair composition. However, by using the additive of the invention, the setting time can be extended to a desired, practical degree as evidenced in Table 6. As pointed out previously, such compositions have the advantage over those of the earlier Examples using the polyphosphate solution of being able to be offered as a factory prepared, one-component product needing only to be mixed with water at the job site.

In further experiments (Examples VIII-X below) with the "one-component" embodiment of the invention, sand and fly ash were employed as filler components, and the nature of the ammonium phosphate component as well as the amount of water added were varied.

EXAMPLE VIII

The following were mixed for two minutes in a blender.

| | |
|---|---|
| ASTM 20-30 Sand | 930 g |
| ASTM C109 Sand | 405 g |
| Fly Ash | 150 g |
| Magnesium Oxide of Ex. I | 495 g |
| Ammonium Phosphate* | 198 g |
| Borax | 39 g |
| Water | 150 g |

*"MON-A-MON" — Fertilizer grade monoammonium phosphate containing 80% monoammonium phosphate and 20% diammonium phosphate.

The resulting mass was poured into molds and the setting time and compressive strengths determined as in the previous examples. The results are reported in Table 7 below.

EXAMPLE IX

The following were mixed for 3 minutes in a blender:

| | |
|---|---|
| ASTM 20-30 Sand | 744 g |
| ASTM C109 Sand | 324 g |
| Fly Ash | 120 g |
| Magnesium oxide of Ex. I | 396 g |
| Ammonium phosphate* | 183.6 g |
| Borax | 31.2 g |
| Water | 71.9 g |

*"MON-A-MON" of Ex. VIII

The resulting mass was poured into molds and the setting time and compressive strengths determined as in previous Examples. The results are reported in Table 7 below.

TABLE 7

| Examples | Setting Time (Min) | COMPRESSIVE STRENGTH | | | | |
|---|---|---|---|---|---|---|
| | | 2 Hrs. | 4 Hrs. | 24 Hrs. | 7 Days | 28 Days |
| VIII | 13 | 4,100 | 5,000 | 7,250 | 10,575 | 11,625 |
| IX | 9 | 4,700 | 6,800 | 10,375 | — | — |

EXAMPLE X

The following were mixed for 2 minutes in a blender.

| | |
|---|---|
| ASTM 20-30 Sand | 131 g |
| Magnesium oxide of Ex. I | 24 g |
| Monoammonium phosphate (Analytical Grade) | 34 g |
| Sodium pyrophosphate | 22 g |
| Borax | 2.11 g |
| Water | 18 g |

The above composition exhibited a setting time of 44 minutes which was an increase of 25.5 minutes over a "control" composition identical to that above except that no borax was present.

It is claimed:

1. A dry, quick setting cementitious composition capable of setting to a hardened mass in less than one-half hour at 70°F following the addition of water alone thereto, and containing magnesium oxide and from about 25 to about 200 weight % based on said oxide of a dry, solid monoammonium phosphate component reactive therewith as the essential binding components, and, as a retarder of the normal quick-setting time of the composition, from about 0.1 to about 20 percent by weight, based on the said binding components, of an oxy-boron compound selected from the group consisting of oxyacids of boron, salts or esters thereof, or mixtures of such.

2. A dry, solid, quick-setting cementitious composition capable of setting to a hardened mass in less than one-half hour at 70°F following the addition thereto of water alone and comprising a mixture of magnesium oxide, from about 25 to about 200% by weight based on said oxide of a solid monoammonium phosphate component reactive therewith, from about 0.1 to about 20% by weight, based upon the combined weight of said magnesium oxide and reactive phosphate of an oxy-boron component selected from the group consisting of oxyacids of boron, salts or esters thereof, or mixtures of such, and up to about 80% by weight of a filler component based on the total composition.

3. The composition of claim 2 wherein the filler is dolomite.

4. The composition of claim 2 wherein the filler is fly ash.

5. The composition of claim 2 wherein the filler is sand.

6. The composition of claim 5 wherein the amount of said oxy-boron component ranges from about 0.1 to about 6%.

7. A dry, solid, quick-setting, cementitious composition capable of setting in less than one half hour at 70°F. and developing a high compressive strength in a few hours upon the addition thereto of water alone, said composition comprising a mixture of magnesium oxide, from about 25 to about 200% weight, based on said magnesium oxide, of a dry solid monoammonium phosphate component reactive therewith, from about 0.1 to about 20% weight, based upon the combined weight of said magnesium oxide and said phosphate, of an oxy-boron set-retarding component selected from the group consisting of oxyacids of boron, salts or esters thereof, or mixtures of such and from about 1 to about 80%, based on the total composition, of a filler component comprised of fly ash.

8. The composition of claim 7 wherein said phosphate component comprises a mixture of monoammonium phosphate and another solid phosphate selected from the group consisting of diammonium phosphate, and sodium pyrophosphate.

9. The composition of claim 7 wherein said filler comprises a mixture of fly ash and sand.

10. The composition of claim 7 wherein said oxy-boron set-retarding component is selected from the group consisting of borax, boric acid, trimethylborate and ammonium pentaborate.

11. An improved cementitious composition having the ability to set to a hardened mass in less than one-half hour at 70°F following the addition thereto of water through the reaction of an ammonium phosphate component and magnesium oxide reactive therewith, said composition containing magnesium oxide and from about 25 to about 200 weight % based on said magnesium oxide of an ammonium phosphate component, the composition further containing as a retarder of such setting reaction from about 0.1 to about 20 weight %, based upon the weight of said phosphate and said oxide components, of an oxy-boron compound selected from the group consisting of oxyacids of boron, salts or esters thereof, or mixtures of such.

12. The improved composition of claim 11 wherein the ammonium phosphate component comprises an aqueous solution of a mixture containing ammonium polyphosphates.

13. The improved composition of claim 11 wherein the ammonium phosphate component is monoammonium phosphate or a mixture containing such.

14. The improved composition of claim 11 additionally containing an aggregate material.

15. The improved composition of claim 11 wherein said reactive phosphate comprises an aqueous solution of ammonium phosphate containing orthophosphate, pyrophosphate and polyphosphate.

16. The improved composition of claim 15 wherein said solution comprises a mixture containing about 35 to 40% orthophosphate, about 45 to 50% pyrophosphate, about 9 to 11% tripolyphosphate and about 2 to 5% of higher polyphosphate.

17. The improved composition of claim 11 wherein said oxy-boron compound is borax.

18. The improved composition of claim 11 wherein said oxy-boron compound is boric acid.

19. The improved composition of claim 11 wherein said oxy-boron compound is trimethylborate.

20. The improved composition of claim 11 wherein said oxy-boron compound is ammonium pentaborate.

* * * * *